INVENTORS
Joseph L. KILLORAN
William K. BARNETT
Joseph A. GUAY

ATTORNEY

Nov. 21, 1967     J. L. KILLORAN ET AL     3,354,250

EXTRUSION METHOD AND APPARATUS

Filed Feb. 26, 1964

INVENTORS
Joseph L. KILLORAN
William K. BARNETT
Joseph A. GUAY

ATTORNEY

United States Patent Office 3,354,250
Patented Nov. 21, 1967

3,354,250
EXTRUSION METHOD AND APPARATUS
Joseph L. Killoran, Drummondville, Quebec, William K. Barnett, Weston, Ontario, and Joseph A. Guay, Drummondville, Quebec, Canada, assignors to Chemcell Limited, a corporation of Canada
Filed Feb. 26, 1964, Ser. No. 347,595
Claims priority, application Canada, Mar. 21, 1963, 871,454
15 Claims. (Cl. 264—176)

This is a continuation-in-part of application Ser. No. 193,383, filed May 9, 1962, and now abandoned.

This invention relates to a process and apparatus for melting and extruding powdered, flaked, granular or other finely divided thermoplastic materials to produce filaments.

Techniques for extruding thermoplastic materials are well-known and are in commercial use. However, in the manufacture of fine filaments for textile purposes, particularly from polyolefins, polyesters and polyamides, many new problems are encountered.

The fibers must be strong, requiring the use of medium to high molecular weight polymer, which has a high melt viscosity, and, in the molten state, is extremely viscous and sticky. Filaments should be elastic and resilient which limits the use of excessive amounts of heat stabilizers, plasticisers or softeners. Although these would assist the extrusion, they adversely affect the characteristics of the extruded fiber. Filaments should be sufficiently uniform in diameter to be used in the form of continuous filament yarns. Denier regularlity and color must be suitable for woven and knitted fabrics.

The melt viscosity may be reduced by increasing the extrusion temperature but only to a limited extent, because excess temperatures lead to polymer degradation and discoloration. Many polymers require the addition of a light "stabilizer" to prevent degradation when exposed to visible or ultraviolet light, but these stabilizers are themselves heat-sensitive and reduce the thermal resistance of the mix. Fine filaments are much more vulnerable to ultraviolet degradation than coarser materials, as for instance monofils. Existing methods are inadequate for one or more reasons. In one method, for example, the thermoplastic material is melted above a heated grid from which it collects in a molten pool below the grid and thence into the inlet of a metering pump which forces it through the spinnerette. Even if the melting is carried out in an inert atmosphere, such a method is unsuitable for mass production of continuous filaments from thermosensitive materials. Decomposition takes place during the extended time the material is held in the molten pool and in the pipes leading to the metering pumps.

In another method a horizontal helical screw type pressure conveyor is employed, having a cylindrical barrel equipped with heating jackets or external electrical band heaters. The heaters must be separated into zones along the length of the barrel, each with its individual temperature control so that the thermoplastic material is gradually heated, compressed, and finally melted as it is conveyed from the inlet to the discharge end. This type of equipment is capable of delivering large quantities of molten material at high pressures and is extensively used in the plastic industry for extruding a great variety of materials for many purposes, but it is not suitable for extruding fine denier filament yarn, without the addition of a metering pump. Even when equipped with a metering pump, equipment of this type suffers from many disadvantages, particularly when required to produce a multiplicity of fine filaments all of uniform denier. Such fibers, as ordinarily used in the textile industry, must be in the range of 1 to 16 denier per filament (d.p.f.). This means that, in the case of polypropylene, the diameter of the filaments would be in the range of 0.0005" to 0.002". A typical example is 4 d.p.f. which has a diameter of 0.001" and is $\frac{1}{100}$ the weight of a monofil of 0.010" diameter. In order to obtain equivalent weight of production of fine filaments from a given extrusion apparatus, the speed of drawdown and takeup must be proportionately faster. Even with takeup speeds of several hundred feet per minute, the output of yarn in pounds per hour is very low.

Because of the high cost of the extrusion screw with all its auxiliary equipment, it is economically unattractive to operate with only one metering pump per screw. This introduces the problem of manifolding a number of metering pumps all supplied from one extrusion screw. Pressure and temperature changes occur in the manifold piping, making it difficult to maintain uniformity over the large number of metering pumps necessary for commercial production of continuous textile filaments. The number of metering pumps which can be fed from one extrusion screw is limited by these considerations, making it necessary to employ a multiplicity of extrusion screws each equipped with a system of manifolds and metering pumps. Each system must be equipped with expensive apparatus for control of temperature of the various zones of the extrusion screws, manifolds and metering pumps, and means for controlling the speed of the extrusion screw and synchronizing with the metering pumps. Unavoidable slight differences in these variables from system to system and from metering pump to metering pump cause differences in pressure and viscosity of the molten polymer at the extrusion jet. These, in turn, cause differences in denier and variations in the physical properties of the filaments, making it difficult to maintain the uniformity essential for textile yarns.

Some polymers such as polypropylene and polyethylene, when used for textile fibers, require additives mixed with the powder (stabilizers) to prevent ultraviolet decomposition and certain pigments and perhaps other additives which melt at a temperature lower than the polymer itself. Despite the fact that the extrusion screw acts as a pump, it is not positive in action. The low melting additives stick to the screw and barrel, while the polymer is still in the powder state. This interferes with the uniform movement of the material through the barrel and increases the tendency towards variations in temperature, pressure and viscosity at the outlet. These variations are not entirely overcome by the metering pump, and so it is difficult to produce a completely uniform product by this method.

Because of the multiplicity of temperature controls, screws, pumps and drives, and the necessity for accurate control, this method is expensive in initial cost and in maintenance cost, and requires excessive labor and downtime for cleaning, when changing the color, or changing to a different type of polymer. The thermosensitive polymer is maintained too long in contact with the heated surfaces and too long in the molten state during its passage through the extrusion screw, manifolds, metering pumps and spinnerette, thus causing decomposition, degradation of product and blockage of the jet by decomposition products. Air mixed with the powder fed to the extrusion screw becomes compressed during its passage through and mixed with water vapour and gaseous products of decomposition. Unless these are removed they form "bubbles" at the spinnerette which prohibit the production of fine continuous filaments. The addition of means for removing these gases further increases the cost and complexity of the equipment.

Other methods of melt spinning known to the applicants suffer from one or more of the disadvantages described.

The applicants have approached the problem of melt spinning without attempting to adopt the standard extrusion screw used in the plastic industry. They have found it possible, by means of a short helical double flight screw rotating in a short vertical splined barrel, of preferred length not more than about six inches, to compact the thermoplastic materials into a solid or plastic plug, force the latter continually against a perforated heating element which is aligned with the lower end of said barrel, so that its leading face is continuously melted or at least softened to extrudable consistency and the polymer, under pressure from the screw-advanced material behind it, immediately and continuously flows through the perforations into a sealed chamber below, containing a filter and spinnerette.

Contrary to the extrusion systems of the prior art the applicants' splined barrel is preferably cooled (rather than heated) by a surrounding water-cooling jacket which carries away heat which may be conducted up from the heating element through the walls of the barrel. The degree of cooling is not critical and may be accomplished simply by circulating water at ambient temperature. This is designed to maintain the screw, barrel and powder at a temperature below the melting point of the lowest melting additive.

In this way all contact of the molten or plastic material with the moving parts is avoided and the residence time of the polymer in the molten condition kept to a minimum. The plug of thermoplastic material between the lower end of the screw and the melting element forms an airtight seal, so that the feed hopper above may be maintained under vacuum. This eliminates air and moisture from the powdered material and frees it from oxidizing atmosphere before it reaches the temperature at which it would decompose.

The pressure screw and splined barrel combination described above can produce the required pressure for compacting, melting, filtering and extrusion. The heated spinnerette is of sufficient diameter to accommodate the number of holes to provide the number of filaments required in the yarn. These may range up to 500 or more. The temperature in the area of the heating element and that in the area of the spinnerette is independently adjustable so as to maintain the heating element at the optimum temperature for melting and the spinnerette at the correct temperature for extrusion.

According to one embodiment of the invention, the melting element is an electrical resistance plate preferably dished to provide increased surface area and the spinnerette can be an electrical resistance plate of the same type. In an alternative construction, the melting element is an elongated metallic block heated by thermal conduction, for example by a band heater. Desirably this block has a receiving surface of greater area than the cross-sectional area than the barrel in which the screw operates so as to accelerate heating. The spinnerette used in conjunction with this heating element may be of the electrical resistance type or can, similarly to the heating element, be mounted in a thermally conductive housing heated by external means.

Preferably, the heating and extruding assembly is mounted on the end of the extruding tube in the form of separable parts and sub-assemblies which may be clamped in series on the end of the tube. In a preferred arrangement, a filter housing sleeve contains the spinnerette, filter support and filters and this sleeve is screwably related to an adapter casting having a skirt carrying a band heater. In this way, the filter housing can be readily attached and detached. This facilitates replacement. In a preferred arrangement, the heating block is mounted on the end of the extruding tube through an adapter ring having an outwardly tapering bore serving as a chamber in which the thermoplastic material can expand into a mass conforming to the greater receiving surface of the heating block.

The more detailed features of the invention will become apparent from the description to follow of preferred embodiments which are illustrated in the accompanying drawings, in which.

Figure 1:
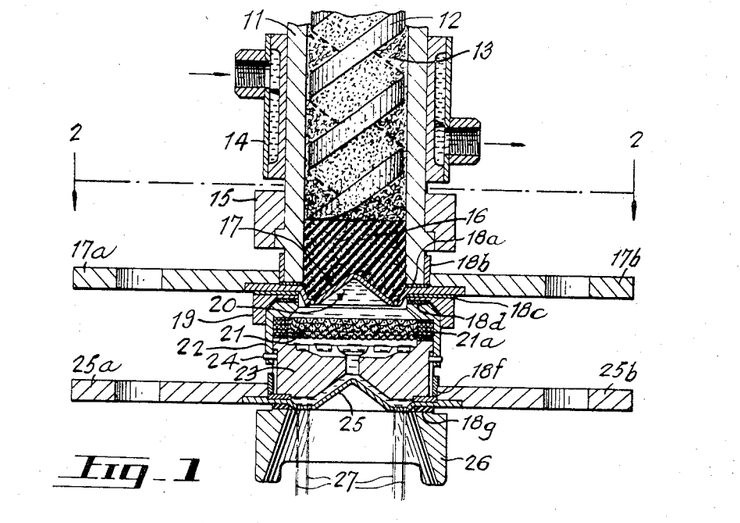
FIGURE 1 is a cross-section through the lower part of a preferred extruding apparatus according to the invention, showing particularly the heating and extruding assembly.

Referring more particularly to FIGURE 1 of the drawings, the extruding apparatus includes a splined cylindrical extruding barrel or tube 11. Working within this barrel is a pressure screw 12 which conveys powder from the hopper and packs it into a solid plug 16 against a melting diaphragm in the form of an orificed electrical resistance plate 17. The distance of the lower end of the screw 12 from the plane of the melting diaphragm 17 is, in the preferred form, as illustrated, approximately 60% of the internal diameter of the barrel 11. The loose polymer in granulated or powdered form is shown at 13. A water-cooling jacket 14, of brass or similar metal, is press-fitted on the outside of the cylindrical barrel 11. A steel collar 15 fits over a shoulder on the outside of the barrel and serves to support the assembly below it, as will be described.

As will be understood by one skilled in the art, the extruding tube or splined barrel 11 leads from a hopper or other container containing the finely divided thermoplastic material 13. In accordance with the invention, the extruding screw works from the hopper into the tube 11 so as the screw rotates material is continually fed from the hopper into the tube 11.

The solid plug 16, of compacted polymer is continually forced against the melting diaphragm 17 and continually replenished by the action of the screw 12 as will be understood from the applicants' earlier United States Patent 2,955,320 (Palmer et al.) and Patent 3,078,509 (Killoran et al.).

Copper terminals 17a and 17b of the melting plate or diaphragm 17 are connected to a source of electrical current. Insulating washers 18a, 18b and 18c of asbestos-base standard packing material, electrically insulate the melting diaphragm 17 from the barrel 11 and from a retaining yoke 19 having a collar portion bearing against the melting plate 17 and a central opening providing a passage leading from the plate 17.

The molten plastic downstream of the melting diaphragm is indicated by 20. A filter pack 21, made up of a series of stainless steel screens in series, ranging from relatively coarse at the entry or upstream side to relatively fine at the discharge or downstream side, is placed below the melting diaphragm 17. The screens are separated and sealed at their periphery by heat-resisting compound gaskets 21a, for example of soft aluminum, and they are separated and supported by interspaced coarser screens (not shown) of the same thickness as the gaskets 21a.

The filter pack is contained in a housing 22, having an upstream collar portion and a downstream skirt portion defining a passage. A support 23 is provided for the filter pack. The support 23 has an annular supporting collar, an underdrain grid to collect the molten polymer, and pedestals bearing against the filter pack downstream face.

The spinnerette 25 is mounted beneath the support 23 and is provided with electrical terminals 25a and 25b. A yoke 26 is secured by four bolts 26a which engage the steel collar 15 so as to firmly clamp together the entire assembly, consisting of melting diaphragm 17, gaskets 21a, retainer 19, filter pack assembly 21 and spinnerette 25. By means of two screws 26b the melting diaphragm 17 is independently supported, when the filter pack is removed for cleaning or renewal. The yoke 26 has a collar portion bearing against the downstream side of the spinnerette 25, laterally extending wings and a central opening defining a passage for the filaments coming from the spinnerette.

A gasket 18d serves as a seal between the filter pack housing 22 and the retainer 19. Gaskets 18e and 18f and 18g serve to electrically insulate the filter pack housing from the spinnerette 25 and the latter from the clamping collar 26. 24 is a retaining spring which serves to hold together the filter pack 21 with its housing 22 and underdrain 23 before clamping into position on the machine.

Figure 2:
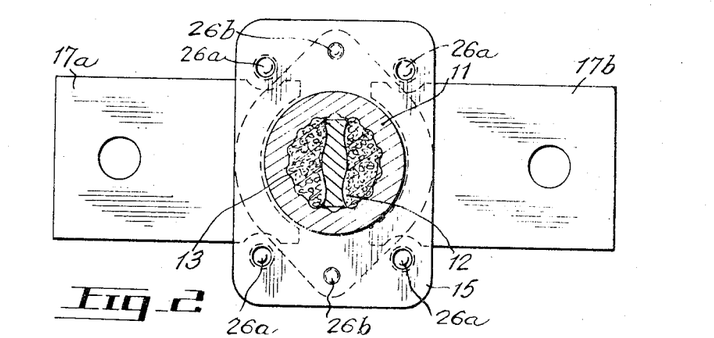
FIGURE 2 is a horizontal cross-section along the line 2—2 of FIGURE 1.
Figure 3:
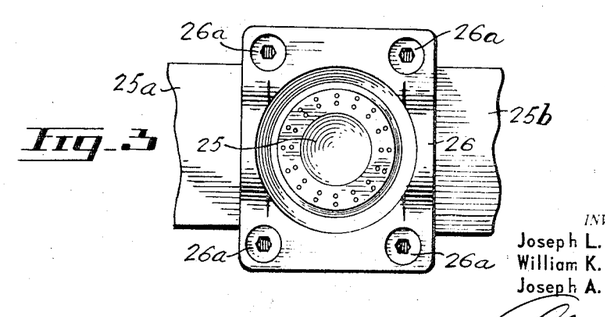
FIGURE 3 is a bottom plan view showing the spinnerette in more detail.
Figure 4:
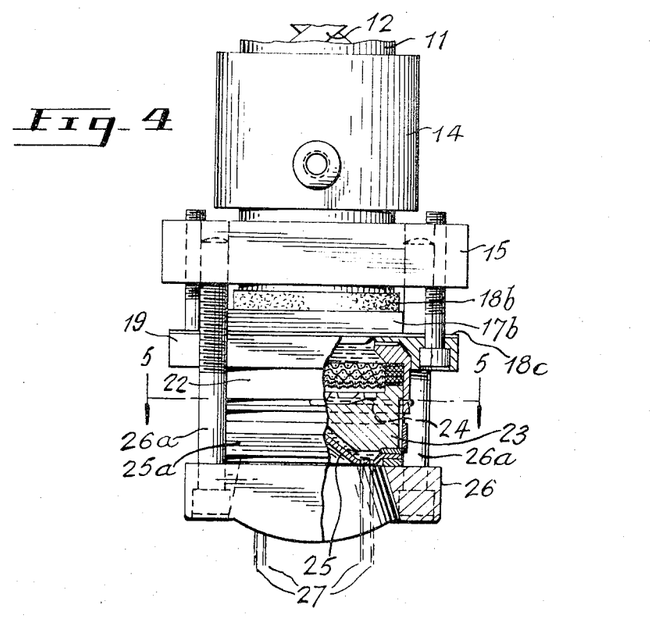
FIGURE 4 is a side elevation partly in section of one type of heating and extruding assembly, showing particularly the clamping means holding the parts to the extruding tube.
Figure 5:
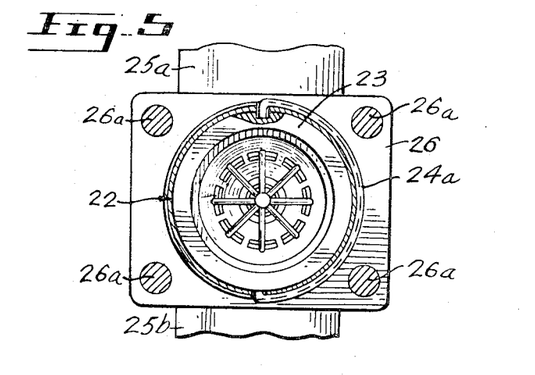
FIGURE 5 is a cross-section taken along the line 5—5 of FIGURE 4 showing the filter support and underdrain in plan view.
Figure 6:
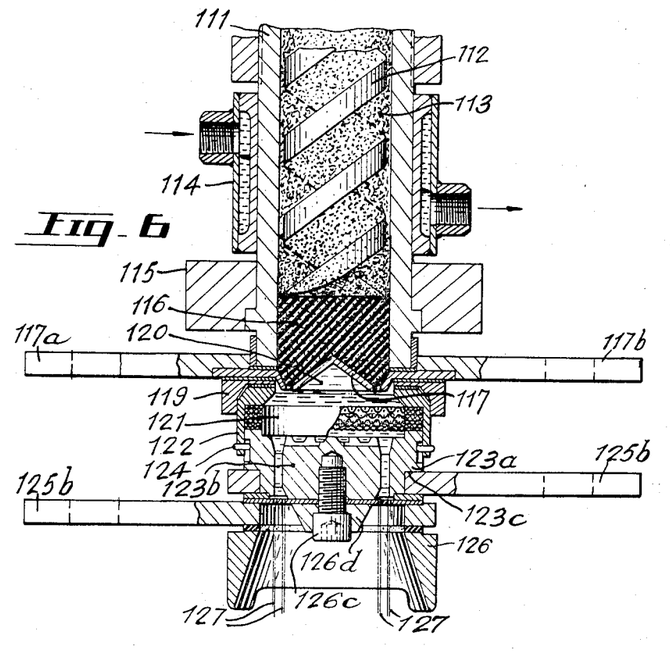
FIGURE 6 is an enlarged cross-section through an assembly similar to that of the previous figures but constructed for radial heating current flow from the center of the spinnerette to the periphery or vice versa.
Figure 7:
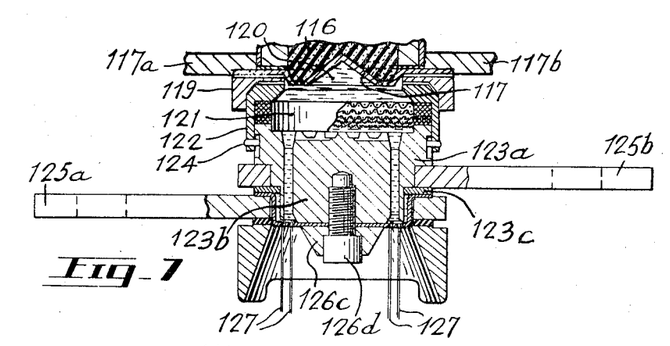
FIGURE 7 is an enlarged cross-section through an apparatus similar to that of FIGURE 6 using a dished rather than a flat spinnerette.

The reference numerals on FIGURES 6 and 7 apply to similar parts, as on FIGURE 2, with the exception that they have been raised by 100 and two additional parts, a spinnerette clamping washer 126d and a spinnerette clamping screw 126c have been added. The outer part 123a is stepped as at 123c to receive the collar of the terminal 125b, and is provided with openings 123a forming passages leading from the spinnerette. In FIGURE 6 the spinnerette is flat and in FIGURE 7 it is dished to have a flat central portion, an upstream extending skirt, and an annular flange extending outwardly from the skirt. The orifices are near the edge of the flat central portion.

The screw 12 which, in the form shown is a helix machined from solid stock, is appropriately driven from suitable driving means and source of power. This driving means is adapted to drive the screw at a uniform speed that could be adjustable for various speeds so that the rate at which the powdered material is extruded into solid form and thence into filaments can be regulated depending on the material being extruded and other factors. The mounting of the screw 12 on its driving apparatus is such that it operates at a fixed vertical distance from the heating diaphragm 17.

The filaments after extrusion are cooled to the right temperature by suitable cooling means, for example an air jet, and then coiled into a strand for further processing. The filaments while shown as circular in cross-section can, of course, be of various cross sections, as required. The resistance melting plate 17 is integral, that is all in one piece, as is the spinnerette resistance plate 25. These plates are of the nature disclosed in United States Patent 3,078,509, Killoran et al.

Alternative construction

Figure 8:
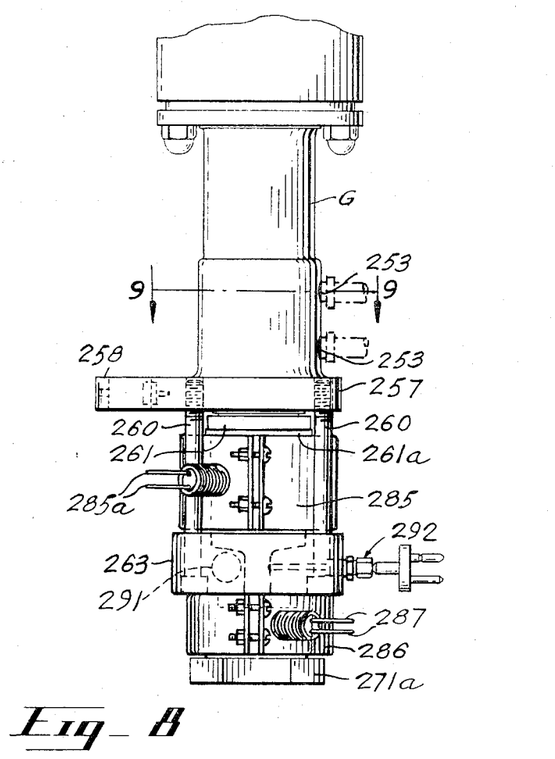
FIGURE 8 is a side elevation showing an alternative form of extruding head according to the invention

FIGURES 8 and following illustrate an alternative preferred form of extruding apparatus according to the invention. A housing G has a central bore lined with an extruding sleeve 251. A screw S operates within the sleeve 251 and may be mounted and driven similarly to the screw 12 of the previously described embodiment.

The housing G has an annular recess 252 which surrounds the sleeve 251 to provide a cooling chamber through which cooling fluid is circulated through inlet and outlet ports 253. The sleeve 251 has a lower externally threaded end 254 which engages the internally threaded end of the housing G. The sleeve 251 also has an outwardly extending shoulder 255 projecting axially beyond the end of the housing G. The end of the housing G is provided with an annular flange 257 into which the assembly bolt 260 extends for securing the heating and extruding head as will be described. A projection 258 of the flange 257 is provided for mounting auxiliary cooling devices.

Figures 9, 10, 11, 12:
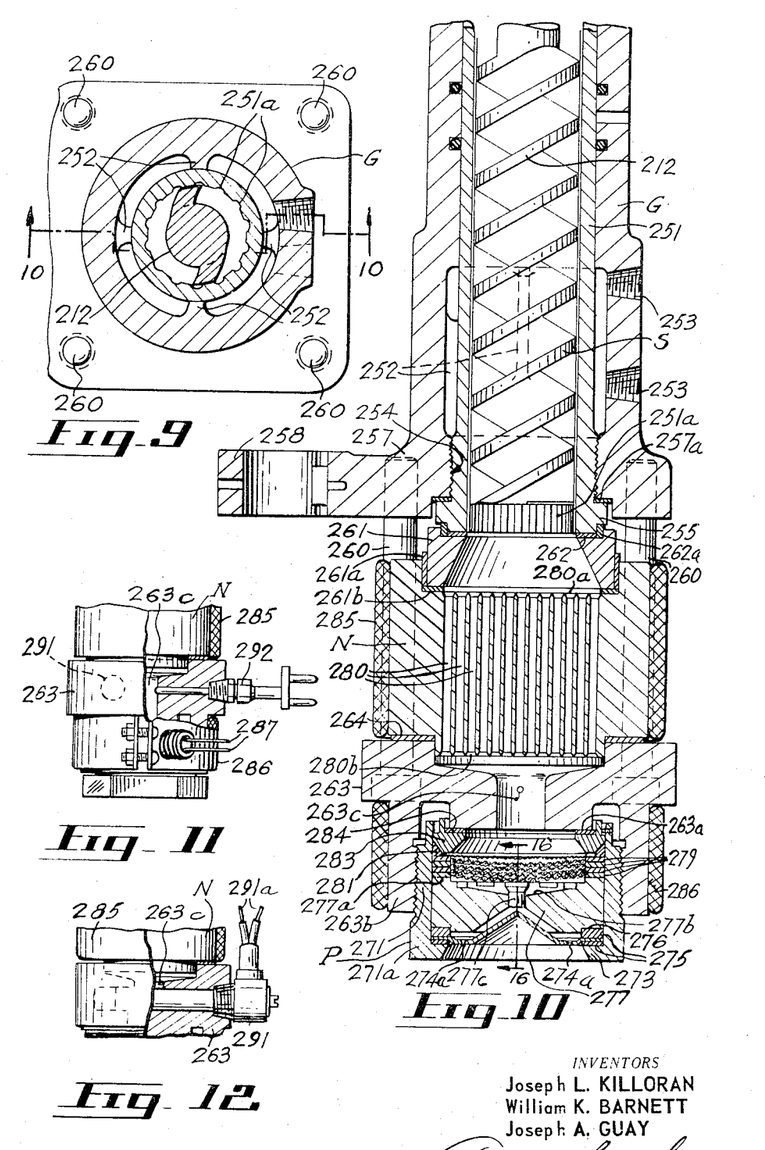
FIGURE 9 is a horizontal cross-section as along the line 9—9 of FIGURE 8.
FIGURE 10 is a vertical cross-section as along the line 10—10 of FIGURE 9.
FIGURE 11 is a fragmentary view showing the adapter casting for the spinnerette band heater and a thermocouple for measuring the temperature of the melt.
FIGURE 12 is a fragmentary cross-section partly in elevation showing the thermoswitch for controlling the current flow to the spinnerette band heater.

The heating and extruding head proper includes a conical expansion ring 261 mounted on the end of the sleeve 251 with intervening gasket members 262a. A cylindrical heating block N has its center completely perforated throughout its length to form a multiplicity of heating passages 280 extending through it from the its upper receiving face 280a to its lower delivery face 280b. The block N bears against the ring 261 through gaskets 261a, 261b. A rectangular adapter casting 263 is clamped against the bottom of the heating block N through a gasket 264. A screw-in filter pack P is mounted in the adapter casting 263. In this way, the whole assembly consisting of the conical expansion ring 261, the heating block N, and the adapter casting 263, with all intervening gaskets, is firmly clamped together by means of four bolts 260 which engage the projecting corners of the rectangular adapter casting 263 and are threadably attached to the bottom of the flange 257 of the housing G.

The adapter casting 263 has an internally threaded downwardly extending skirt 263b providing a cylindrical housing for the filter pack and a central axial channel 263c leading through the casting 263 to the filter pack. The filter pack P is made up of a sleeve 271 which has an upper externally threaded portion which engages the internally threaded part of the skirt 263b so that the assembly P may be screwed upward into the skirt 263b. The lower end of the sleeve 271 has a hexagonal downwardly projecting head 271a with an inwardly projecting shoulder 273. A spinnerette 274 having a number of spinning orifices 274a is mounted within the sleeve 271 (see FIGURE 16) so that its margins bear against the inner side of the shoulder 273 with a gasket 275 intervening. An annular gasket 276 bears against the upper side of the margin of the spinnerette 274 which in turn bears against the cylindrical filter support block 277. The upper side of the filter support block 277 is made with an annular flat shoulder 277a and a central conical depression 277b having a system of radial ribs 277d having upper faces flush with the shoulder 277a, thereby providing an underdrain system to convey the molten material from the filters to a central passage 277c leading to the spinnerette. The underside of the filter block support 277 is provided with a domed part to receive the central part of the spinnerette 274 and to form with it an outwardly extending frusto-conical passage for the molten material. Resting on the shoulder 277a is a series of superposed rings 279 each carrying a filter screen 279a extending across the central depression 277b.

Figures 15, 16:
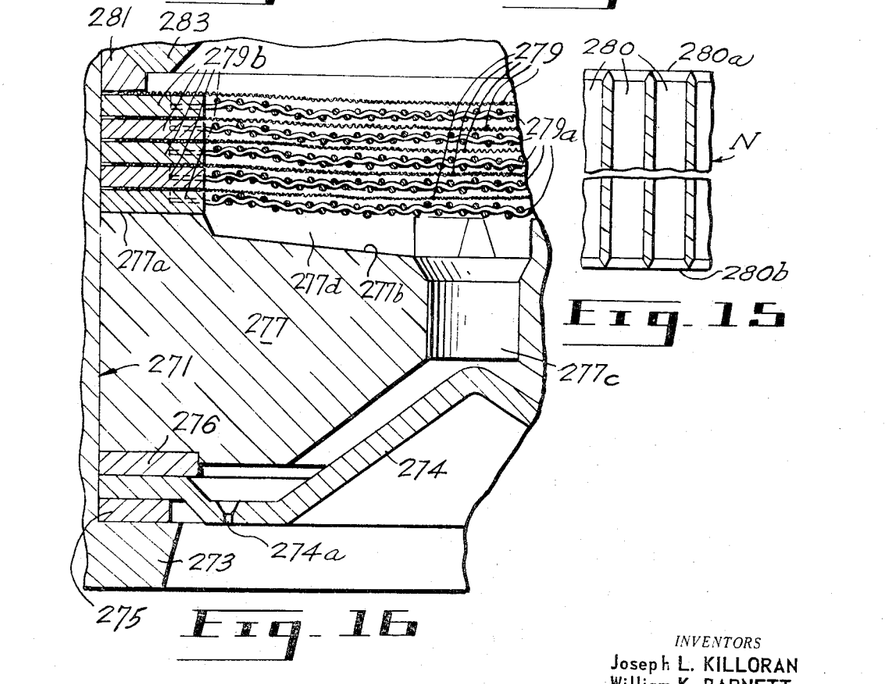
FIGURE 15 is a vertical cross-section along the line 15—15 of FIGURE 14 showing further the configuration of the heating passages.
FIGURE 16 is a very greatly enlarged fragmentary cross-section along the line 16—16 of FIGURE 9 showing the relationship of the parts making up the spinnerette assembly.

The screens 279a are coarse wire screens of 30 mesh by .013 diameter wire which serve as a support and underdrain system for the intervening fine filter screens 279 which range from 80 to 300 mesh and are clamped between the rings 279b. The dimensions of these screens are preferred dimensions.

An expanding gasket ring 281 (FIGURE 9) bears against the uppermost ring 279b on one side and against a conical pressure ring 283 on the other side which, in turn, bears against the block 263 through an intervening metallic gasket 284.

By the action of rotating the filter pack P in the threaded skirt of the adapter casting 263, the whole assembly, consisting of the spinnerette 274, its gaskets above and below, the filter support 277 and the rings 279b, and the expanding gasket ring 281 and the conical pressure ring 283, are clamped and held together under pressure between the shoulder 263a of the adapter casting 263 and the shoulder 273 of the filter pack housing. The wedging action due to the pressure of the conical ring 283 against the aluminum gasket 281 causes it to expand, thus creating a seal to prevent leakage of the molten material along the cylindrical wall of the sleeve 271.

Heating means

The block N is surrounded by a band heater 285. The band heater 285 is connected through an adjustable autotransformer, e.g. a "variac," to a suitable source of power, providing manual temperature adjustment. Likewise the skirt 263b of the block 263 is surrounded by band heater 286 which is connected to a source of power, through a separate adjustable transformer.

FIGURES 11 and 12 show arrangements for controlling the temperature of the melt at the point of extrusion by adjustment of the current to the bottom band heater 286. A thermoswitch 291 is embedded in the adapter casting 263 in close proximity to the passage 263c. The temperature of the casting 263 at this point will be equivalent to the temperature of the melt with a fixed differential. Therefore, by suitably calibrating the thermoswitch 291 the amount of current may be fed to the band heater 286 so as to maintain the desired temperature of the melt at the point of extrusion. Electrical leads for the band heater are shown at 287. These leads are connected in series with the leads 291a of the thermoswitch 291. 292 represents a thermocouple which has a sensitive end projecting into the passage 263c. The thermocouple 292 may be connected to a suitable instrument for monitoring so that the temperature of the melt can be accurately observed at all times.

Operation

The operation of the form of apparatus shown in FIGURES 8 to 16 is as follows. The thermoplastic material to be extruded is fed in powder, pellet, or flake form. The material comes from a hopper and is fed into the sleeve 251 by the screw S. Between the screw S and and upper face of the block N the material is consolidated under pressure into a semi-plastic block which expands outwards from below the end of the screw S into the conical bore of the ring 261 until it matches the perforated area of the face 280a of the block N. The block of material is continuously urged against the face 280a by the action of the screw S and its lower face continuously melted and drawn off while it is continuously replenished at its upper face. Actually, a relatively thin layer of the block of thermoplastic material against the face of the heating block N is softened to a condition in which it can enter the heating passages 280 in the block N where it is further heated to the required temperature and liquefied to a filterable condition. The molten material then passes down through the passage 263c and thence through the filter pack P and eventually through the spinnerette passages 274a.

Quenching

The filaments extruded from the spinnerette passages 274a may be suitably quenched by means known in the art, for example by blowing air on them transversely. Air should not be blown directly onto the spinnerette as this would interfere with the temperature control.

There is a natural tendency for heat to migrate from the melting block N to the sleeve 251 but this tendency is partially impeded by the gaskets 261a, 261b and 262 which are made of asbestos compound. Any remaining undesirable heat is removed by circulation of coolant in the jacket 252 so that the temperature at the bottom of the sleeve 251 is maintained below the melting point of the lowest melting ingredient in the material to be extruded. The plug of material at the bottom of the screw is solid, inside the tapered ring 261 it is semi-plastic and at the face 280a of the block N it is plastic and semi-molten. In this way the temperature of the powder at the bottom of the screw is kept well below the softening temperature of the polymer. Otherwise it would stick to the screw and extrusion would become erratic.

The temperature of the block N is adjusted to provide the desired temperature of the molten polymer at the delivery face 280b. This temperature will be close to the required extrusion temperature as well as a temperature suitable for filtering. To prevent heat loss from the filter pack and the spinnerette and also to provide final temperature adjustment for extrusion, the second band heater 286 is provided. The latter may be controlled manually by means of an adjustable auto-transformer or automatically by a thermoswitch. In either case, the temperature may be monitored by means of a thermocouple 392 (FIGURE 11) which has its sensitive end projecting slightly in the passage 263c.

The temperature will vary according to the type of polymer, the melt index and viscosity of the polymer, the rate of extrusion, the method of quenching, and also the desired denier per filament (d.p.f.).

Characteristics and operation of block N

The block N is preferably of aluminum or aluminum alloy. It has to be long enough so that the band heater can impart enough heat to it and have enough heated surface so that it does not exceed the permissible watts per square inch within fairly well defined limits for band heaters. The distance from the surface 280a to 280b has to be sufficient to give the desired temperature rise to convert the material from plastic condition at which it can be forced into the perforations 280 into filterable molten condition. The upper shoulder on the block N is for the purpose of accommodating the heater. The central recess at the top of the block N and the central projection at the bottom provide a convenient way of assembling the various parts together so as to maintain concentricity. At the same time this arrangement provides for a maximum distance of travel between the receiving surface and delivery surfaces of the block without an excessive overall length of the apparatus. For a preferred example, sleeve 251 may have a diameter from about 1" to about 1¼" and that of receiving surface 280a proportionately from about 1½" to about 2", with screw S spaced from surface 280a from about ⅞" to about 1¼". Where surface 280b matches in diameter the tube or sleeve 251, the former may be mounted directly on the latter with gaskets intervening, omitting ring 261.

Figures 13, 14:
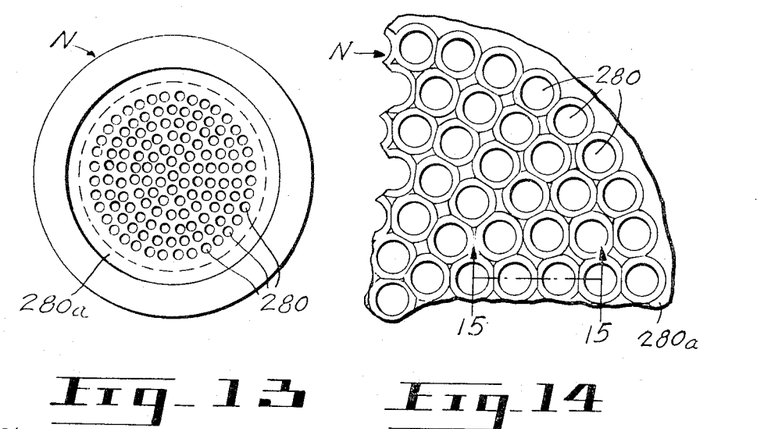
FIGURE 13 is a bottom plan view of the perforated heating block of the melting head of FIGURE 8 showing the distribution of the heating channels.
FIGURE 14 is an enlarged fragmentary bottom plan view of the perforated heating block of FIGURE 13 showing the distribution of the ends of the heating channels and the construction of the outlet.

The size of the heating passages 280 is such as not to induce undue resistance to the flow of molten material through the block N under pressure from the screw S. On the other hand, the passages 280 must be small enough to attain the required amount of heating surface in the area available. The number of passages is, generally speaking, the number that can be gotten into the area of the receiving face 280a while still maintaining adequately wide ligaments between them to conduct the heat to the central portion of the block. The entrance to each of the passages 280 is tapered so as to increase the surface area against the polymer and to reduce the resistance to the flow. The discharge end of each of the passages 280 is also tapered to assist in merging of the melt as it is discharged from the block N.

The nature of the holes or passages 280 is governed by the following considerations. The diameter should be kept to a minimum consistent with reasonable pressure drop from the inlet to the outlet. The length is tailored to suit the temperature rise required. The number depends on the rate of extrusion that is the maximum debit expected from the jet. It is advantageous to have as many as possible in order to increase the surface area for heat transfer. The ligaments between the holes must be sufficient for heat conduction from the outside of the block to the center.

The material can be visualized, for the purposes of explanation, to be in solid form at the foot of the sleeve 251 beneath the screw, then in a plastic condition within the tapered adapter chamber 261, then in a semi-molten condition as it approaches the receiving surface 280a. It is forced into the passages or openings 280 in this semi-molten condition and is converted into the molten condition in which it is completely fluid, after its passage through the melting orifices 280, and leaves the delivery surface 280b in this molten and filterable condition. The temperature of the molten material is further increased in its passage through the filter pack by the heating action of the band heater 286, so as to achieve optimum extrusion temperature when it reaches the orifices in the spinnerette 274. The extrusion temperature is important, since the physical properties of the filaments depend on a proper extrusion temperature. As an example, consider polypropylene. The softening temperature is within the range from 168° C. to 170° C. At this temperature the material becomes semi-plastic and sticky. The temperature required for filtering and extrusion may be as high as 280° C. Therefore, the temperature is increased during passage of the polypropylene through the perforations in the block from approximately 170° C. to 270° C., or 280° C., that is, there is about 100° C. rise from the initial softening at the entrance to the block to the molten condition at the outlet of the block.

For this reason, the heat exchange passages must be of considerable length. In the case of polypropylene, for example, in an apparatus where the inside diameter of the sleeve 251 and the diameter of the receiving surface 280a are substantially of the preferred dimensions stated above, the length of the orificed part of the block N preferably ranges from about 1¼ inch to about 2 inches.

While these figures apply to polypropylene, other polymers, for example, polyethylene, also have a considerable range between the softening and the molten state and this may vary considerably for the different polymers. The dimensions and spacing of the parts of the apparatus would be adjusted accordingly in conjunction with the feeding speed, temperatures and other conditions.

The invention has particular application to polymers of the type where there is considerable difference between the temperature at which the material becomes semi-plastic and sticky to when it actually becomes molten and in a filterable and extrudable condition. However, the application is not limited to such materials and can be applied to the extrusion of various thermoplastic materials.

Characteristics of other parts

Preferred characteristics of the parts are as follows. The housing G is made of cast iron. The sleeve 251 is made of a hardened and tempered steel and is splined on the inside to provide longitudinally spaced-apart grooves 251a of semi-circular section. The gasket 257a is made of soft copper, its function being to prevent leakage of coolant fluid from the jacket 252 between the housing G and the sleeve 251.

The function of the gaskets 262 is two-fold. They act partially as a heat barrier to prevent migration of heat from the block N upwards to the sleeve 251 and also to prevent leakage of the molten polymer from the interior. The gaskets 262 are preferably made of an asbestos composition. The conical expansion ring 261 is preferably made of steel. The gasket 261a serves as a heat barrier between the block N and the expansion ring 261 and also serves to maintain concentricity of the assembly. The gasket 261a is preferably made of asbestos compound. The gasket 261b is of the same material and serves as a heat barrier and a seal between the ring 261 and the block N.

The gasket 264 is made of soft aluminum that serves as a seal to prevent escape of molten material from between the casting 263 and the block N and also serves as a heat conductor to equalize temperatures between the block N and the adapter casting 263. The casting 263 is made of cast iron or semi-steel in cast form. The sleeve 271 is made of steel. The expanding gasket 281 is made of aluminum. The wedge ring 283 is made of steel and the gasket 263a of aluminum. The gasket 281 serves to prevent upward or outward leakage of molten polymer and assists in heat transfer from the adapter casting 263 to the filter pack P. The filter support 277, in the form shown, is preferably made of steel. The rings 279 are made of aluminum. Both the support screens 279a and the filter screens between and above the support screens are of stainless steel. The gaskets 275 above and below the margin of the spinnerette 274 are made of aluminum. These gaskets serve as a seal on the outer annulus of the spinnerette, i.e. to prevent molten material from escaping between the filter support 277 and the skirt 271a or around the spinnerette 274.

Advantages

Among the advantages of the alternate form of apparatus and method shown in FIGURES 8 to 16 are the following.

(1) The use of band heaters in place of resistance elements permits a greatly expanded heating area over the cross-sectional area of the sleeve in which the screw operates as compared with a resistance plate placed directly on the bottom of the extruding sleeve.

(2) The combination of the increased area of the receiving face together with the increased length of the heating passages made possible by the use of a block multiplies the effective heating surface many-fold, thus permitting a higher rate of melting and a lower maximum temperature.

(3) The arrangement permits a relatively rapid through-put without exceeding a maximum permissible temperature which is governed by the degradation temperature of the polymer, i.e. the rate of extrusion may be considerably higher.

(4) The replaceable filter pack facilitates rapid change of filters and jet in case of blockage e.g. by the normal collection in the filter of foreign matter or gel fractions of the polymer which may find their way through the filter.

We claim:
1. A method of producing artificial, filamentary products from powdered, fusible, resinous material, comprising:
 continuously pressure-feeding the powdered resinous material in a steady stream from a supply source into an unobstructed confining passage terminating in an orificed heat conductive metal melting element heat insulated from said confining passage and remote from said feed,
 applying a steady pressure against the resinous material in said passage so as to compress the resinous material in the passage against said melting element,
 continuously cooling the resinous material up to entry of said material into said passage, continuously heating said melting element so as to render fluid a layer of the resinous material adjacent to said melting element and continuously forcing through the orifices in the melting element small streams of the fluid material as fast as it is received, controlling the feed to obtain a steady speed correlated to the temperature of the melting element and effective continuously to maintain the major part of the material in said confining passage as a plastic mass, continuing to confine the resinous material in a further passage while passing it through the further passage and then urging it against a spinnerette, continuously heating the spinnerette independently of the heating of the melting element effectively to heat the spinnerette uniformly to maintain in molten condition the resinous material adjacent to it and continuously drawing the molten resinous material in filamentary form through the spinnerette, the entire pressure feed being effected by a single pressure-feed screw in an integral unit.

2. A method as claimed in claim 1 wherein the material is pressure-fed through a barrel which is cooled and maintained at a temperature at which the material therein is not softened, the material being subjected to gradually increasing temperature in said unobstructed confining passage.

3. A method as claimed in claim 2 wherein the material is expanded in volume by passing through a passage portion of increasing cross-section simultaneously with being subjected to increasing temperature in said confining passage before it is pressed against said melting element.

4. A method as claimed in claim 3 wherein the molten material is passed through a filter situated between said melting element and said spinnerette and of a diameter at least approximately equal to the maximum diameter of said passage portion of increasing diameter, said filter means being arranged in heat conductive relationship with said spinnerette heating means, whereby the molten material leaving the melting element is caused to pass through the filter in a molten state at a temperature not exceeding that of the spinnerette.

5. A method as claimed in claim 4 wherein said resinous material is maintained in an initial zone in said confining passage at a temperature in which it is not softened and in an intermediate zone at an increasing temperature in which it is progressively softened, the temperature and feeding speed being so coordinated that the material is in said initial zone a solid dry block, and at the intermediate zone a plastic mass of progressively increasing softness and immediately adjacent the melting element a molten layer.

6. A method as defined in claim 1 of producing artificial, filamentary products from powdered, fusible, resinous material, comprising, continuously pressure-feeding the powdered material in a steady stream from a supply source into an unobstructed cylindrical confining passage having an exit defined by an orificed heat conductive block having a plurality of elongate orifices extending therethrough, said block being insulated from said confining passage and remote from the feed, applying a steady pressure against the material in said passage at a distance sufficiently far removed from the block to prevent turbulence at the block and effective to press the major part of the material in the passage into a semi-solid plastic mass, continuously heating the block by means of a surrounding band heater to heat it substantially uniformly to melt a layer of the resinous material pressed against it and to maintain the said major part above the layer in said plastic condition, continuously passing through the orifices in the block small streams of the molten layer as fast as it is produced, controlling the feeding to a steady speed effectively continuously to maintain the mass of the material in the confining passage in said plastic condition while it is melted and advanced through said block, continuing to confine the material in a passage while passing it through a filter, subsequently urging it against a spinnerette plate insulated from the confining passage, continuously heating said spinnerette by means of a band heater independently of the said block to a temperature effective to heat it uniformly to maintain in molten condition the resinous material adjacent to it, and continuously drawing off the resinous material in filamentary form through the spinnerette, the entire pressure feed being effected by a single pressure-feed screw in an integral unit.

7. Extruding apparatus for use in the production of artificial, filamentary products from powdered, fusible, resinous materials, comprising, in a unitary apparatus:

a barrel, an enlargement in the lower end of said barrel defining a confining passage, an orificed heat conductive melting element closing said confining passage at its lower end and heat insulated from said confining passage, a pressure feed screw rotatable in said barrel, said screw being adapted upon rotation to apply steady pressure againstt solid resinous material in said passage to compress said material in the passage against said melting element, means for continuously heating said melting element to render fluid a layer of said resinous material adjacent thereto in the confining passage and to maintain at least the major part of the resinous material above said layer in said heat insulated confining passage in a compressed plastic mass, whereby the resinous material in a fluid state is continually forced through the orifices in the melting element in small streams as fast as such material is received, the temperature of said melting element being controllable in correlation with the speed of rotation of the screw so as effectively and continuously to maintain the major part of the material in said confining passage as a compressed plastic mass, means defining a further passage below said melting element, a spinnerette closing said further passage at its lower end, means for continuously heating said spinnerette independently of the heating of the melting element so as effectively to heat the spinnerette uniformly to maintain in molten condition the resinous material adjacent to it, whereby such material may be drawn off in filamentary form through the spinnerette.

8. Apparatus as claimed in claim 7, further comprising means for continuously cooling said barrel.

9. Apparatus as claimed in claim 8 further comprising filter means located in said further passage between said melting element and said spinnerette, said filter means being arranged in heat conductive relationship with said spinnerette heating means, whereby the molten material leaving the melting element is caused to pass through the filter in a molten state at a temperature not exceeding that of the spinnerette.

10. Apparaus as claimed in claim 7 wherein the heating block comprises a cylindrical body having a central portion containing said apertures in the form of elongate channels, and a surrounding housing portion, said central portion being recessed at the upstream end with respect to said housing portion, and protruding at the downstream end with respect to the housing portion, whereby the housing portion is offset upstream from said central portion said housing portion being surrounded by an external band heater, said upstream offset housing portion extending upstream over part of the height of said unobstructed confining passage, so as to assist in raising the temperature of the material in said confining passage to a plastic state before it reaches said central portion of the heating element.

11. Apparatus as claimed in claim 10 wherein said confining passage expands downstream towards said heating block.

12. Apparatus as claimed in claim 7, including a housing mounted below the first heating means and having a downwardly extending annular internally threaded sleeve portion surrounded by a band heater, a filter pack having a sleeve provided with an upper externally threaded part engaging within the internally threaded sleeve part of the housing, said filter pack sleeve having a lower portion of polygonal outer contour having at its lower end an inwardly extending shoulder, a spinnerette in said filter pack sleeve bearing against said shoulder, a filter support and filter above said spinnerette, said housing being provided with a central passage for molten thermoplastic material surrounded by a downwardly extending collar, and gasket means between said collar and the inside of said sleeve and said filter whereby when said filter pack is screwed inwardly of said housing said gasket means is secured to render liquid-tight the connection between said housing passage and said sleeve.

13. Apparatus as claimed in claim 7 including an adapter ring mounted on the end of said barrel and having a bore having at the barrel end a cross-sectional area substantially the same as the barrel and tapering outward to a delivery end having a cross-sectional area substantially greater than that of the barrel, the heating block being mounted on the delivery end of said ring, said block having a central portion comprising said channels and having a receiving face of substantially the cross-sectional area of the downstream end of the ring passage and an outwardly extending portion, the receiving face of the heating block closing the end of ring passage thereby to retard the material received under pressure and to form it into a compressed mass and to soften the leading portions and cause them to pass through said orifices.

14. Apparatus as claimed in claim 7, wherein the said barrel is provided with outwardly extending connecting means, and there are provided means connecting said housing and said outwardly extending connecting means thereby to clamp the housing, heating block and adapter ring against the end of said barrel, a band heater surrounding the sleeve portion of said housing, and means for supplying electrical current to heat the band heater on the heating block and on the housing separately whereby the housing and block may be kept at different temperatures.

15. Apparatus as claimed in claim 7, comprising a filter pack including an outer sleeve having an upper annular externally threaded part, said sleeve being provided at its downstream end with an inwardly extending shoulder, a spinnerette mounted across the downstream end of the sleeve and bearing on said shoulder, a filter support above said spinnerette and provided with a central underdrain recess having across it filter supporting means and an outer annular shoulder, a plurality of filter members having superposed annular rings of which the lowermost bears on said shoulder and filter means mounted on said rings.

References Cited

UNITED STATES PATENTS

| | | | |
|---|---|---|---|
| 1,904,884 | 4/1933 | Royle | 18—12 |
| 2,011,055 | 8/1935 | Klugh | 264—176 |
| 2,253,176 | 8/1941 | Graves | 264—176 |
| 2,323,383 | 7/1943 | Dreyfus | 18—54 |
| 2,740,986 | 4/1956 | Lipscomb et al. | 18—8 |
| 2,765,491 | 10/1956 | Magerkurth | 18—12 |
| 2,770,837 | 11/1956 | Reifenhauser | 18—12 |
| 2,839,784 | 6/1958 | Weber et al. | 264—176 |
| 2,879,543 | 3/1959 | McDermott | 18—8 |
| 2,888,711 | 6/1959 | Finlayson et al. | 264—176 |
| 2,898,628 | 8/1959 | Phipps | 18—8 |
| 2,923,970 | 2/1960 | Genovese | 18—8 |
| 2,955,320 | 10/1960 | Palmer et al. | 264—176 |
| 3,010,147 | 11/1961 | Davies et al. | 264—176 |
| 3,027,355 | 3/1962 | Taul et al. | 18—8 |
| 3,065,502 | 11/1962 | Lorenian | 18—12 |
| 3,078,509 | 2/1963 | Killoran et al. | 18—8 |
| 3,197,533 | 7/1965 | Robinson et al. | 264—176 |

FOREIGN PATENTS 606,673  7/1960  Italy.

ALEXANDER H. BRODMERKEL, *Primary Examiner.*

DONALD J. ARNOLD, *Examiner.*

J. H. WOO, *Assistant Examiner.*